Nov. 24, 1959  R. M. ACKERMAN  2,914,651
AUTOMATIC WELDING FIXTURE FOR CRUSHER ROLLERS
Filed March 9, 1959  2 Sheets-Sheet 1
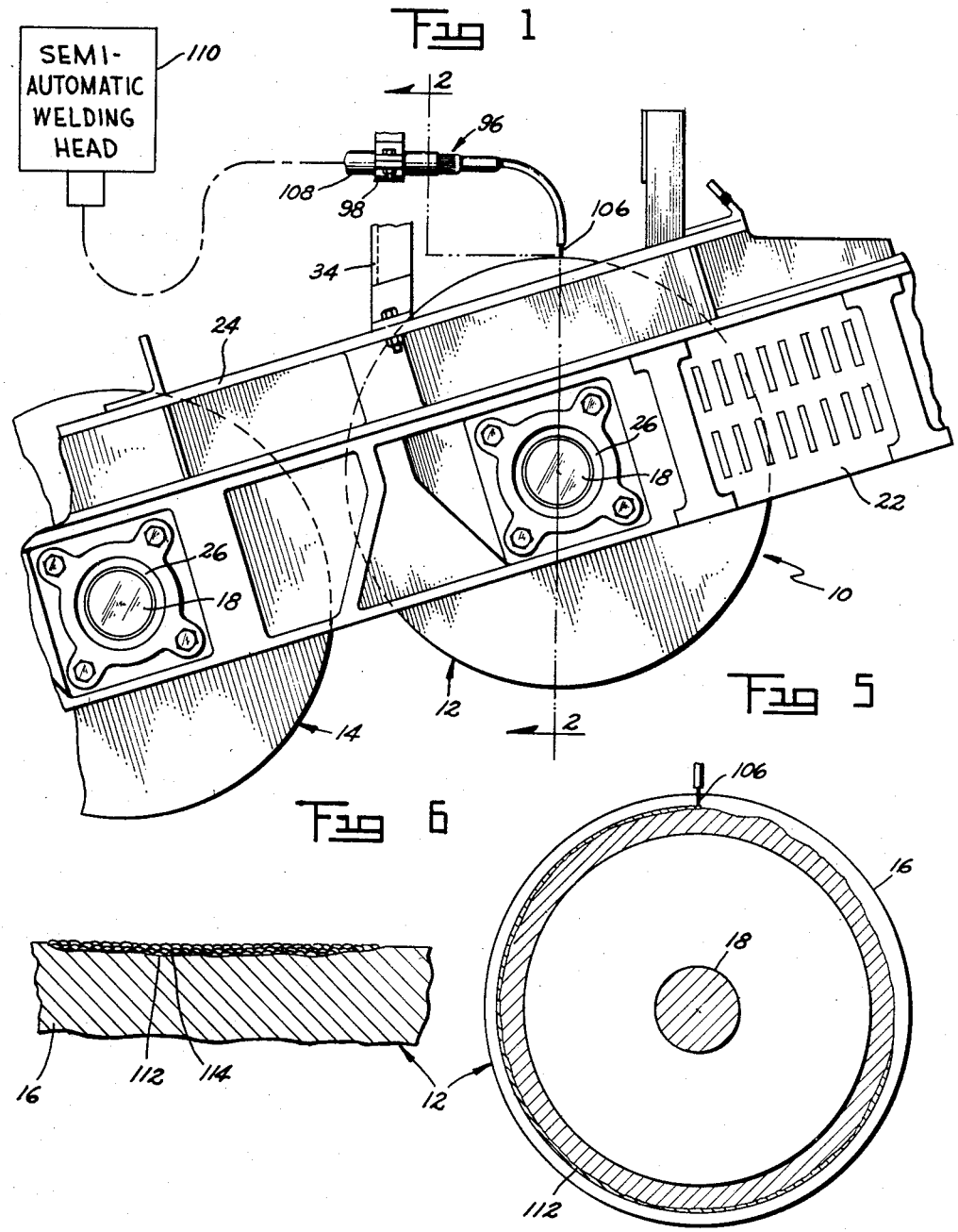
INVENTOR.
ROBERT M. ACKERMAN
BY
Stuart R. Peterson
ATTORNEY Nov. 24, 1959 R. M. ACKERMAN 2,914,651
AUTOMATIC WELDING FIXTURE FOR CRUSHER ROLLERS
Filed March 9, 1959 2 Sheets-Sheet 2
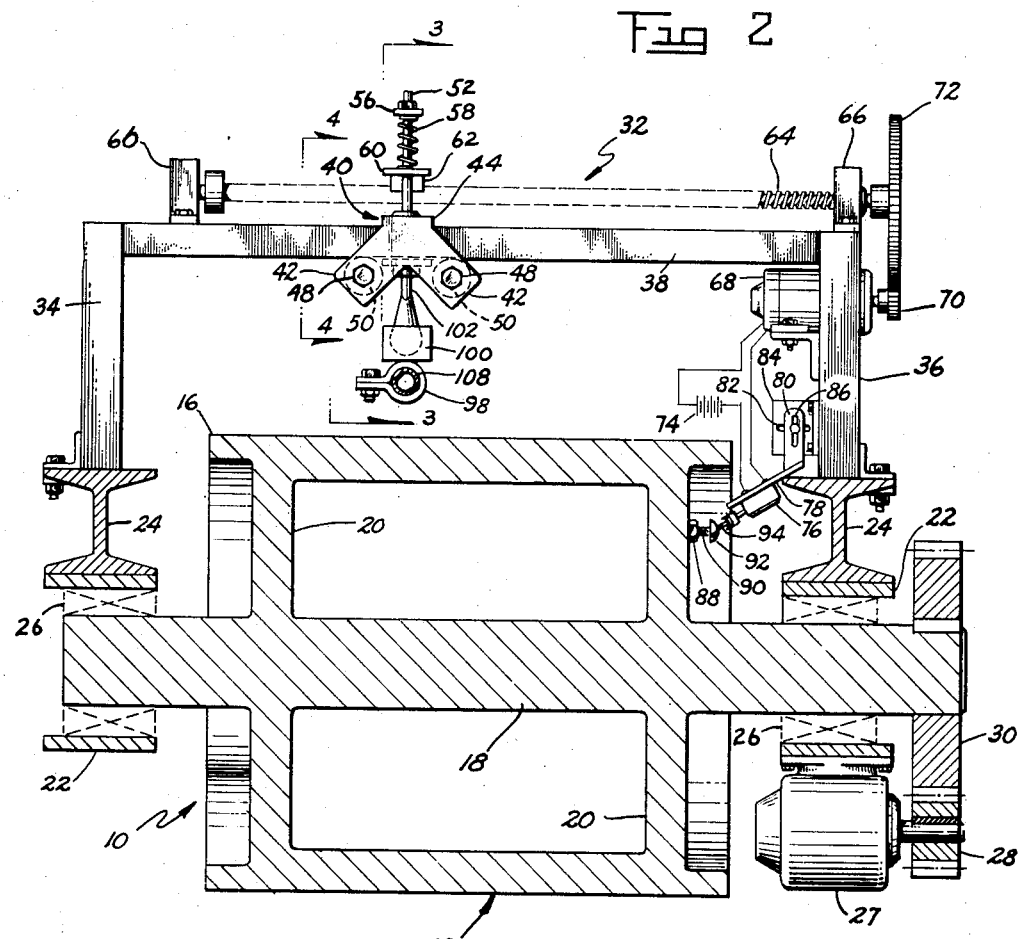
INVENTOR.
ROBERT M. ACKERMAN
BY
Stuart R. Peterson
ATTORNEY

| United States Patent Office | 2,914,651
Patented Nov. 24, 1959 |
|---|---|

2,914,651

AUTOMATIC WELDING FIXTURE FOR CRUSHER ROLLERS

Robert M. Ackerman, Minneapolis, Minn.

Application March 9, 1959, Serial No. 797,925

6 Claims. (Cl. 219—76)

This invention relates generally to welding, and pertains more particularly to a fixture for building up worn crusher rollers with an overlay of deposited weld metal.

The application of metallic overlays or facings to worn cylindrical surfaces is of course not new. Both manual and automatic techniques have been employed. Where the metal cylinder is relatively light weight, such as a shaft or drum, various automatic welding procedures have been rather conveniently employed. However, where the cylindrical article is massive, such as with large rollers for crushing rocks, the weld metal has heretofore been deposited manually, for it is exceedingly costly to remove the two heavy rollers of which the crusher is comprised. Although not as costly as removing the rolls, either for repair or replacement, the manual practice still is quite tedious and expensive.

Accordingly, one object of the invention is to provide a simple fixture for surmounting a crusher roller or the like in situ in order to re-clad its worn surface with weld metal.

Another object is to provide an automatic welding fixture that is exceedingly economical to use, it actually being possible to build up a set of crusher rolls for less cost than the labor would amount to in removing the rollers for replacement.

Another object is to provide a fixture for repairing crusher rollers that does not require the presence of a skilled welder for its operation. Also, the operator does not have to be in attendance at all times. This not only releases him for other duties, but has the distinct advantage that he does not have to constantly breathe in the welding fumes.

A still further object of the invention is to provide an automatic welding fixture that is quite rapid, more than twice the weight of metal being easily deposited in a given period of time over that applied by manual techniques. More specifically, the invention makes it possible to repair completely a set of rollers over a week-end when the crushing equipment is not apt to be in service.

Yet another object of the invention is to apply the facing metal more uniformly than heretofore done by hand, and at the same time maintain a more uniform heating of the roller, whereby a superior overlay is achieved.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a fragmentary side elevational view of a typical rock crusher, only enough of my automatic welding fixture being depicted to show its attachment and general orientation with respect to the crushing apparatus;

Figure 2 is a sectional view taken generally in the direction of line 2—2 of Figure 1;

Figure 3 is a sectional view of the direction of line 3—3 of Figure 2;

Figure 4 is a view in the direction of line 4—4 of Figure 2;

Figure 5 is a sectional view taken in a radial plane through a portion of a crusher roller, the view showing the initial stage of building up a worn roller, and Figure 6 sectionally depicts a fragmentary longitudinal portion of a crusher roller illustrating a roller that has been rebuilt to the cylindrical configuration pictured in Figure 2.

Referring first in detail to Figures 1 and 2, sufficient description will first be given concerning a typical rock crushing apparatus so that the benefits to be derived from the practicing of my invention will be better appreciated. Accordingly, the exemplary crushing apparatus has been denoted generally by the reference numeral 10. The apparatus 10 includes a pair of rather massive crusher rollers 12, 14. Normally, these rollers are comprised of a plurality of parts, such as a separate shell, shaft, segmented end plates having tapered edges through bolts, and tapered split sleeves. However, the specific construction is not important to an understanding of the instant invention, so in Figure 2 the cross sectional make-up of the roller 12 has been simply depicted as a one-piece construction having a cylindrical shell 16, a shaft 18 and integral end plates 20. The rollers 12 and 14 are identical.

The apparatus 10 further includes heavy side girders 22 and I-beams 24. The girders 22 journal the shafts 18 via suitable bearings 26. Inasmuch as the mountings for these bearings 26 are fairly complex, being spring loaded in practice, and since they contribute nothing to the invention itself, they have been illustrated generally in Figure 1 and only schematically in Figure 2.

To illustrate an appropriate driving means for the rollers 12, 14, an electric motor 27 of appropriate rating has been shown bolted to the underside of one of the girders 22. Through the agency of a pinion 28 keyed to the motor shaft, the motor drives a bull gear 30 which is in turn keyed to the shaft 18. Although not appearing in the drawings, a gear train serves to rotate the roller 14 in an opposite direction from the direction in which the roller 12 is rotated. In other words, roller 12 would be driven counter-clockwise as viewed in Figure 1 and roller 14 clockwise.

It is believed readily apparent that a hopper would be mounted so as to feed the rocks to be crushed into the region between the rollers 12 and 14, whereas a conveyor disposed below would receive and remove the crushed aggregate as it drops from the rollers. It is the constant crushing and grinding of the rocks against the surface of the rollers 12 and 14 that causes the rollers to become dished as seen in Figure 6. Figure 5 also shows this condition to some advantage. When it is recognized that considerable superstructure, such as the rock supply hopper, is usually installed above the rollers and also that the rollers are exceedingly heavy, cumbersome and difficult to remove, the need for an automatic arrangement capable of replacing the metal lost by wear becomes manifest.

The automatic welding fixture for overlaying the worn rollers with new metal has been designated in its entirety by the reference numeral 32. In the fixture 32 that has been pictured there is a pair of vertical standards or uprights 34, 36. Fixedly carried at the upper ends of these uprights 34, 36 is a cross beam 38.

The cross beam 38 acts as a supporting track for a small carriage or trolley 40. As viewed in Figure 2, the carriage has the appearance of an inverted Y, and when viewed from either side, as in Figure 4, it has the appearance of an inverted U. Thus, the carriage 40 has a pair of downwardly diverging arms 42 at both the front and back, and has a bridging portion 44 connecting the arms. The bridging portion 44 slidably rides on the upper side of the beam 38. Preferably, the carriage 40 is equipped with a pair of spacers 46 which slidably bear against the fore and aft sides of the beam 38. A pair of pins 48 extend through the arms 42 and each rotatably supports a small roller 50, the rollers 50 bearing against the underside of the beam 38. In this way the carriage or trolley 40 is constrained to traverse a rectilinear path along the beam 38.

The means for actuating the carriage 40 will now be described. To achieve the actuation, a pair of upstanding rods 52 have their lowered ends fixedly anchored on the bridging portion 44 of the carriage 40. A pair of retaining nuts 54 are threadedly attached to the upper ends of the rods 52, the nuts maintaining a cross strip 56 captive. Reactively engaging the strip 56 is a pair of coil springs 58. The springs 58 are compressed somewhat so as to urge a second strip 60 downwardly, this second strip having apertures near its ends which only loosely encircle the rods 52. Integral with the strip 60 is a half nut 62 having a threaded section bearing downwardly against the upper side of a threaded shaft 64. The shaft 64 has its opposite ends rotatably supported in a pair of pillow blocks 66 attached to spaced sections of the beam 38.

The shaft 64 is intermittently driven by a relatively small motor 68, supported on the upright 36, via a pinion gear 70 and a large gear 72. Energization of the motor 68 is from a source 74 through a normally open switch 76. The switch 76 is adjustable relative to the upright 36 by means of an arm 78 to which it is attached, the arm having a vertically directed slot 80 for effecting up and down adjustment. A slot 82 in a bracket 84 secured to the upright 36 permits horizontal adjustment. The arm 78 is held against the bracket 84 by means of a clamping bolt 86 which passes through both slots 80 and 82.

An appropriate projection on the roller 12 is used to actuate or cam the switch 76 to its closed position once each revolution of the roller. As illustrated, a nut 88 has been temporarily attached to the right end plate 20, as by tack welding. Threadedly received in the nut 88 is a bolt 90 whose head 92 strikes the projecting end of an arm 94 constituting a part of the switch 76. In this way it can be seen that as the motor 27 turns the roller 12, the bolt head 92 will impinge against the arm 94 once each revolution. The greater distance the head 92 is from the nut 88, the longer the switch arm 94 will be depressed to energize the motor 68.

Up to this point nothing has been said as to the manner in which the actual depositing of metal takes place. In the illustrated case, a tubular welding nozzle 96 of conventional construction is suspended from the carriage or trolley 40 via a clamp 98 attached to a ball and socket joint 100. A set screw 101 serves the express purpose of holding the nozzle 96 at the appropriate angle, inasmuch as it bears against the ball portion of the joint 100. The ball portion of the joint 100 is attached to the lower end of a threaded stud 102, the upper end of this stud being threadedly received in a plate 104 secured to the inner sides of the carriage 40.

The welding nozzle 96 directs a comparatively small diameter wire 106, say 7/64", onto the roller 12 via a flexible tube 108 from a conventional semi-automatic welding supply or head 110. As is generally known, the equipment 110 feeds the wire 106 constantly, and therefore the weld metal is continuously deposited on the roller 12. Although persons familiar with the welding art will be able to select the proper electrode material for the wire 106, a manganese alloy has been found suitable, and for the assumed diameter of 7/64" a welding current of approximately 300 amperes has been used. However, these factors are subject to wide modification, depending upon the particular circumstances, but will offer no problem to one familiar with welding techniques in general.

In view of the detailed description included herein, the operation of my automatic welding fixture 32 will be understood by those versed in the welding art. Briefly, though, after setting up the fixture 32, as shown in Figure 2, and assuming that the roller 12 has become dished or worn, thereby deviating from the cylindrical configuration depicted in this figure and instead looking as it does in Figures 5 and 6, the operator will manually raise the half nut 62 and then shift the carriage 40 to a point superjacent a locus spaced not too far from the center of the dished or scalloped section. The springs 58 readily yield sufficiently to permit the raising of this nut 62, and the release thereof will immediately cause it to engage once again the threads of the shaft 64. The drive motor 27 may then be started. Next the welding equipment 110 is placed in operation so as to feed the wire 106 out through the nozzle 96 onto the roller 12.

Owing to the rotation of the roller 12 while the weld wire is being fed, a welding bead 112, such as that depicted in Figure 5, will be deposited. As a guide in orienting the reader as to an appropriate starting place for depositing this first bead, such a bead has also been identified in Figure 6 by the same numeral.

The bead 112 may extend completely around the shell 16, or only part way, before the bolt head 92 strikes the switch arm 94 to energize the motor 68. This motor 68 runs only so long as the switch 76 is maintained in a closed position. However, this period is previously determined so that the carriage 40 will be shifted just enough in order that a second bead 114 is deposited alongside the first bead 112.

The above course of action can be permitted to continue until a first overlay is completed. Then a second overlay is inaugurated radially outward and so on until the concave portion has been built up to its original cylindrical shape. Then one would turn the nozzle through 180° to rebuild the second roller 14, relocating the uprights 34 and 36, if necessary.

It might be explained that sometimes such a fast deposit rate is undertaken that the roller 12 would be unduly heated. If such should be the case, it should be understood that a complete succession of contiguous beads need not be laid, for after several, or, say ten, have been deposited, the operator can readily lift the half nut 62 so that a surface section of the roller 12 can be temporarily skipped. This permits the section that has just been faced to cool somewhat before adding more weld metal to that particular region. The fixture 32 is exceedingly versatile in this respect.

One should especially observe that with my welding fixture, there is no elaborate or complicated mechanism needed to synchronize the lateral shifting of the carriage 40 with the rotation of the roller 12 or the roller 14, depending on which is being repaired at the particular moment. In prior art situations helical beads have been applied where complex lead screw arrangements have been used in order to synchronize the lateral displacement with the rotation of the article. Such an achievement would indeed be difficult where no removal of the rollers 12, 14 is contemplated and is to be avoided because of its expense associated therewith.

The foregoing detailed description has been given for clearness of understanding only, and no unnecessary limitations should be understood therefrom, and the appended claims should be construed as broadly as permissible in view of the prior art.

What is claimed is:

1. A welding fixture for resurfacing a worn cylindrical roller comprising means for depositing a bead of weld metal onto the roller as the roller is rotated, electric motor means for shifting said depositing means axially relative to said roller, and switch means responsive to the rotation of said roller for actuating said shifting means only once each revolution of the roller, whereby an overlay of weld metal is deposited in the form of a succession of adjacent annular beads.

2. A welding fixture for resurfacing a worn cylindrical roller comprising means for depositing a bead of weld metal onto the roller as it is rotated, means for guiding said depositing means axially relative the roller, electric drive means for shifting said depositing means along said guide means, and means carried by said roller for energizing said electric drive means once each revolution of said roller for a period sufficient to shift said depositing means to an extent such that a succession of side by side circumferential beads are formed.

3. A welding fixture for resurfacing a worn cylindrical roller comprising frame means, a carriage slidable along a portion of said frame means, means for depositing a bead of weld metal onto the roller as it is rotated, said depositing means being suspended from said carriage, threaded means for advancing said carriage along said frame portion, an electric motor for rotating said threaded means, and switch means responsive to each revolution of said roller for energizing said motor and thereby actuating said threaded means to advance said carriage a predetermined distance along said frame portion.

4. A welding fixture for resurfacing a worn cylindrical roller comprising a pair of upright members, a cross member extending between the upper ends of said upright members, whereby said upright members can be mounted so that said cross member is substantially parallel to the axis of the roller to be resurfaced and is at an elevation above the roller's surface, a carriage slidable along said cross member, means for depositing a bead of weld metal onto the roller as it is rotated, said depositing means being suspended from said carriage, a threaded shaft extending parallel to said cross member, threaded means on said carriage engageable with said shaft, electric motor means for rotating said shaft to shift said carriage from one position to another along said cross member, switch means for energizing said motor means, and means carried by said roller for actuating said switch means to effect a predetermined energization of said motor means and hence a predetermined rotation of said threaded shaft to cause sufficient shifting of said carriage so as to move said depositing means to a different locus so that a succession of side by side beads are formed.

5. A welding fixture for resurfacing a worn cylindrical roller comprising a pair of upright members, a cross member extending between the upper ends of said upright members, whereby said upright members can be mounted so that said cross member is substantially parallel to the axis of the roller to be resurfaced and is at an elevation above the roller's surface, a carriage slidable along said cross member, means for depositing a bead of weld metal onto the roller as it is rotated, said depositing means being suspended from said carriage, a threaded shaft extending parallel to said cross member, a pair of vertical guide rods carried by said carriage and projecting upwardly on either side of said threaded shaft, a strip member having a pair of spaced apertures loosely encircling said guide rods, a half nut anchored to the underside of said strip member and engageable with said threaded shaft, spring means normally biasing said nut into engagement with said threaded shaft, an electric motor coupled to said shaft for rotating same, a normally open switch in circuit with said motor for energizing same, said switch being disposed near one end of said roller, and projection means on said one end of the roller engageable with said switch to close same once each revolution of the roller thereby to energize said motor for a sufficient period to cause said carriage to be shifted enough so that a second bead is deposited adjacent to the first.

6. A welding fixture in accordance with claim 5 including an adjustable bracket for supporting said switch on one of said upright members and in which said projection means includes a nut affixed to said one end of the roller and a threaded bolt received therein for effecting closure of said switch.

References Cited in the file of this patent
UNITED STATES PATENTS

| | | |
|---|---|---|
| 1,886,503 | Schockey | Mar. 8, 1932 |
| 1,924,876 | Morgan | Aug. 29, 1933 |
| 2,299,747 | Harter | Oct. 27, 1942 |
| 2,427,350 | Carpenter et al. | Sept. 16, 1947 |
| 2,868,165 | Altman | Jan. 13, 1959 |